United States Patent [19]

Rose

[11] Patent Number: 5,313,637

[45] Date of Patent: May 17, 1994

[54] METHOD AND APPARATUS FOR VALIDATING AUTHORIZATION TO ACCESS INFORMATION IN AN INFORMATION PROCESSING SYSTEM

[76] Inventor: David K. Rose, 800 E. Ocean Blvd. Apt. #1410, Long Beach, Calif. 90802

[21] Appl. No.: 807,957

[22] Filed: Dec. 10, 1991

Related U.S. Application Data

[63] Continuation of Ser. No. 277,673, Nov. 29, 1988, abandoned.

[51] Int. Cl.$^5$ .............................................. G06F 13/00
[52] U.S. Cl. ........................................ 395/725; 380/4; 380/28; 340/825.31; 364/DIG. 2; 364/940; 364/942.3; 364/942.4; 364/918.7; 364/949.71
[58] Field of Search .................. 380/4, 28; 340/825.3, 340/825.31, 825.34; 902/1, 2; 395/725

[56] References Cited

U.S. PATENT DOCUMENTS

| | | | |
|---|---|---|---|
| 4,450,535 | 5/1984 | de Pommery et al. | 364/900 |
| 4,467,139 | 8/1984 | Mollier | 902/2 X |
| 4,601,011 | 7/1986 | Grynberg | 364/900 |
| 4,652,698 | 3/1987 | Hale et al. | 902/1 X |
| 4,713,753 | 12/1987 | Boebert et al. | 364/200 |

OTHER PUBLICATIONS

Horgan, John, "Thwarting the information thieves," *IEEE Spectrum*, Jul. 1985, pp. 30–41.

*Primary Examiner*—Paul V. Kulik
*Attorney, Agent, or Firm*—Stanger, Stempler & Dreyfus

[57] ABSTRACT

Access authorization is validated for an information processing system wherein a "slave device" such as a terminal desires access to information contained in or controlled by a "master device" such as a computer. Apparatus associated with the slave device receives validation data from the master device, modifies it according to a pre-determined algorithm implemented through logical circuitry in the apparatus, and returns the resulting "convoluted" data to the master device. The same validation data is convoluted in the master device through mathematical implementation of the algorithm. If the two sets of convoluted data match, it is presumed that the slave device is authorized to access information through the master device.

17 Claims, 7 Drawing Sheets

METHOD AND APPARATUS FOR VALIDATING AUTHORIZATION TO ACCESS INFORMATION IN AN INFORMATION PROCESSING SYSTEM

This is a continuation of application Ser. No. 277,673, filed Nov. 29, 1988 now abandoned.

FIELD OF THE INVENTION

The present invention relates to the security of information associated with an information processing system. More specifically, it provides a method and apparatus for determining whether a "slave device" is authorized to access data, programs, operations, or other information contained or controlled by a "master device". Typical applications include multi-user computer systems, in which the computer is the master device and peripheral devices such terminals and printers are slave devices, and multi-computer networks, where the computer controlling access to the desired information is the master device and the computer desiring access is the slave device.

BACKGROUND OF THE INVENTION

Information security is a major concern relating to information processing systems. Many approaches have been conceived to prevent unauthorized access to sensitive, confidential, or proprietary data, programs, or operations.

These approaches range from simple, physical control to complex and highly sophisticated electronic implementations of mathematical techniques. A summary of prior art techniques follows; these are shown in order of generally increasing complexity:

physical control
- mechanically locked enclosure or facility
- key-operated switch
- user must have proper program or data media electronic lock
- plug-in access module
- key-pad whose keys must be depressed in specific sequence identification
- computer queries device for electrical identification code
- user enters personal name, code name, or password
- access card with magnetic or optical card identification
- computer verifies user's physical characteristic (e.g., fingerprint, voice, typing pattern)

transmission coordination
- transmitting or receiving device signals or requests data transfer
- receiving device confirms receipt for transmission to continue transmission security
- data encoding: received data must be decoded (e.g., conversion of ASCII codes to alphanumeric characters)
- data encryption: received data must be decrypted (e.g., character substitution)
- data scrambling received data must be filtered and re-assembled (e.g., data manipulation and removal of extraneous data)

Physical control, electronic locks, identification, and transmission coordination restrict access to the devices, data, programs, or operations. Transmission security does not necessarily preclude access to information, but data is not meaningful unless processed properly.

It has been demonstrated that no single nor combination of approaches or implementations can provide total security; at best, the amount of time, effort, or cost to gain unauthorized access is so great that it provides an effective deterrent.

BRIEF DESCRIPTION OF THE INVENTION

The present invention is directed at apparatus, method, and system means for determining whether a slave device is authorized to access information such as data, programs, or operations contained in or controlled by a master device. It is applicable to both entry and retrieval of information.

Information processing systems typically include a computer or computer-controlled master device, one or more slave devices physically separate from the master device, and interface links to electronically interconnect the devices. Examples of such systems include time-sharing and multi-user networks where a "host computer" acts as the master device, and local area networks where a "file server" acts as the master device.

Slave devices include, but are not limited to:
- input devices (keyboards, terminals, card readers, etc.)
- output devices (printers, plotters, displays, monitors, etc.)
- storage devices (disk units, tape units, etc.)
- other computers (work stations, remote computers, etc.)
- communication devices connected to other slave devices The inventive system employs validation apparatus associated with the slave device and validation means associated with the master device. The system has two modes of operation: a "normal" mode and a "validation" mode.

In the normal mode of operation, all information transferred between the master device and the slave device is unaffected; the inventive system is "transparent" to the master device, slave device, user, programs, operations, and data.

In the validation mode, the apparatus receives "validation data" from the master device. This validation data is "convoluted" in accordance with a pre-determined algorithm implemented through electronic logic circuitry in the apparatus, and the resulting "convoluted data" is returned to the master device. The master device contains a mathematical equivalent of the convolution algorithm, used to predict the data to be returned by the apparatus. The master device compares the data returned by the apparatus to the predicted data to validate whether the slave device specifically associated with the apparatus is authorized to access information through the master device.

The master device initiates the validation process by sending a pre-defined "enable validation code" to the apparatus. The master device then sends a number to the apparatus; this defines how much subsequent data is to be convoluted by the apparatus and returned to the master device for validation.

A simple example illustrates the concept and basic operation of the validation process. In this example, the master device is a computer, the slave device is a terminal, the enable validation code is the unique combination of characters XBF, the validation data are the 8 characters abcdEFGH, and the convolution algorithm converts upper-case characters to lower-case and vice versa. The computer transmits XBF8abcdEFGH to the apparatus; the apparatus should return ABCDefgh to the computer.

If the response from the apparatus matches the predicted response, it is presumed that the terminal specifically associated with the apparatus is authorized to access information in the computer. If the responses do not match, it is presumed that access is not authorized (for instance, if the authorized terminal were replaced by an unauthorized device lacking the validation apparatus). The action to be taken if a validation fails is established by the management of the information processing system and can range from notifying the computer operator to automatic discontinuance of communication between the computer and terminal.

The level of security realized in accordance with the principles of the invention can be enhanced through more sophisticated implementation of the convolution process than illustrated in this example. For instance, the convolution algorithm can be much more complex, and the apparatus can include multiple sets of convolution logic with different algorithms; the algorithm to be used for each set of validation data can be specified by the computer at the start of each validation.

There are also other ways in which the start and length of the validation process can be implemented to further frustrate discovery and circumvention of the validation process. The enable validation code and specification of the number of characters to be convoluted can be "embedded" in apparently normal characters transmitted by the computer. For example, the apparatus can be connected to receive all information transmitted by the computer to the terminal. "Normal" information will pass unchanged to the terminal, and will not affect the apparatus. The validation process in the apparatus can be enabled upon occurrence of a specific bit pattern in any character or set of characters sent by the computer, with the bit pattern of another character or set of characters defining the number of characters to be convoluted.

The computer's program can include a response-time check to determine whether the apparatus has returned convoluted characters within an expected time; if not, it is presumed that the proper apparatus/terminal/computer connection is not intact.

Three basic implementations of the apparatus are possible. The "self-contained" version comprises all circuitry necessary to install the apparatus as an independent unit, typically between the master device and the slave device. This version includes data transmission and reception circuitry, a microprocessor, read-only memory for controlling the microprocessor, the convolution logic, and associated support circuits for power, timing, and control functions.

The "add-on" version takes advantage of elements such as data reception and transmission circuitry, microprocessor, read-only memory, and power, timing, and control circuitry already incorporated in many slave devices. This implementation typically uses an adapter board inserted between the slave device's microprocessor and its socket, with the adapter board containing the convolution logic and circuitry to enable it under control of the microprocessor. The add-on version requires minor changes to the slave device's read-only memory program; these allow the microprocessor to recognize the enable validation code, to route signals to and from the convolution logic, and to synchronize completion of the validation mode through a character counter.

In the "designed-in" version, the convolution logic and associated signal routing circuitry are incorporated into the design of the slave device. This is similar to the add-on version, but the elements required for the invention are included as part of the slave device's circuitry, rather than on an adapter board.

The present invention offers several unique advantages:

First, logic circuitry, rather than program code stored in read-only memory, is used for implementing convolution algorithms in the invention's apparatus. The contents of virtually all read-only memory elements (PROMs, EPROMs, etc.) can be retrieved—and duplicated—through the use of widely-available, relatively low-cost equipment. The logic circuitry in the apparatus can be encapsulated; attempts to remove encapsulation material typically destroy the circuitry, as well. This circuitry can also be implemented through elements such as programmable logic devices which include a "fusible link" that can be "blown" after programming to prevent retrieval of the logical coding.

Second, the convolution logic can be implemented as plug-in modules, allowing algorithms to be changed at random intervals for increased security.

Third, operation of the invention can be totally "transparent" to the user. The master device can initiate the validation mode at any time, without involving or notifying the user. (In the example above, with the transmission link between the computer and terminal operating at the common data rate of 9600 bits/second, the process for validating a set of 8 characters requires approximately 20 milliseconds. For comparison, keyboard entry averages about 100 milliseconds per character when typing 100 words per minute.)

If desired, however, the operation can be implemented to involve the user. For example, the master device can request the user to enter an access code, with the apparatus convoluting that code before transmitting it to the master device.

Fourth, no changes are required to the master device circuitry to implement a system in accordance with the principles of this invention. Changes are required in the "front end" or device input/output portions of the master device's software; the main information processing routines are not affected.

Fifth, the invention can be used with most existing slave devices, and it can be used alone or in conjunction with most existing data transmission, access, and security techniques. It allows these to operate as at present, but adds or augments security by introducing another level of deterrence to be overcome in gaining unauthorized access.

DETAILED DESCRIPTION OF EMBODIMENTS OF THIS INVENTION

A typical embodiment of this invention is for use in a system in which the master device is a computer and the slave device is a terminal. The terminal and the computer are connected through a serial data link, with information represented by ASCII character codes. The validation apparatus is "added onto" an existing terminal, and the invention makes use of the terminal's microprocessor, read-only memory, and interface and support circuitry.

Figure 1:
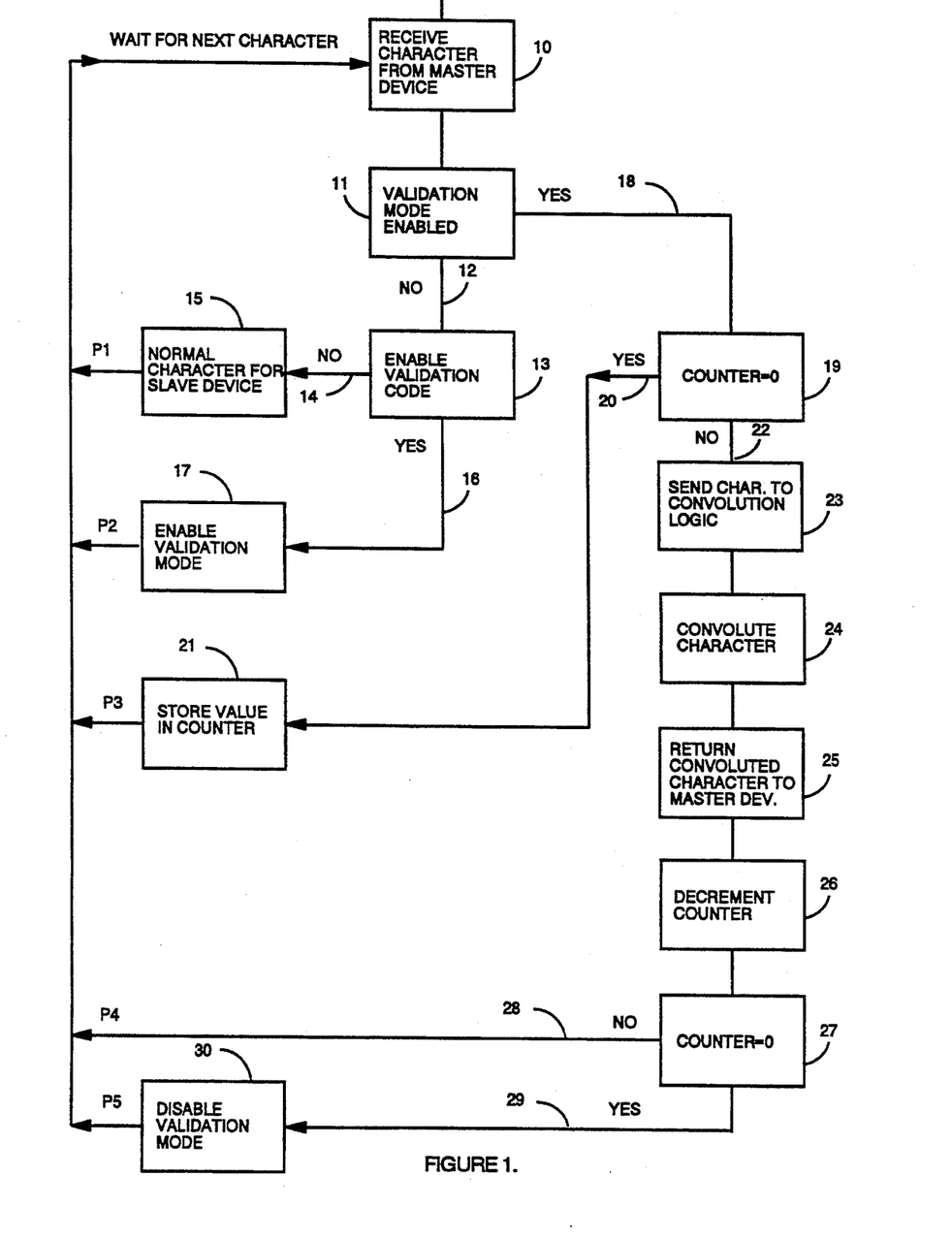
FIG. 1 is a flow diagram of information within the validation apparatus and the slave device with which it is associated in an access authorization system in accordance with the principles of this invention.

FIG. 1 shows the five functional paths for information flow in the validation apparatus and the terminal with which it is associated, in accordance with the principles of this invention.

Path P1 is the "normal" mode of operation, in which information between the computer and terminal is unchanged and unaffected by the invention. In this mode, the invention is "transparent" to the computer, terminal, programs, data, operations, and to the user; all operate as if the invention were not present, and the "validation" mode of the invention is disabled.

During the normal mode of operation, all information received by the terminal from the computer (master device) is monitored, as indicated by block 10. The "validation mode enabled" condition (block 11) is tested after receipt of each character. Since the validation mode is not enabled (line 12), each incoming character is checked to determine if it is an "enable validation code" (Block 13). If the character is not an enable validation code (line 14), the character is processed by the terminal as a "normal" character (block 15).

If an enable validation code is received (line 16), the validation mode of operation is enabled (block 17); this is Path P2. Receipt of an enable validation code also sets the validation mode enabled condition (block 11); this condition remains set (line 18) until it is reset by completion of the validation process, as will be shown below. The enable validation code in this embodiment can be a pre-defined single character or unique combination of characters which would not be transmitted by the computer to the terminal for operations other than to enable the validation mode.

In this embodiment, the numeric value of the next character received from the computer after the enable validation code is used with a "character counter" (block 19) to specify the number of subsequent characters to be used to validate access authorization. A value of zero in the counter (line 20) signifies the start of the validation mode, and the numeric value from the computer is stored in the counter (block 21); (Path P3).

Path P4 represents the operations during the validation mode. With the validation mode enabled (line 18) and the character counter value not zero (line 22), each "validation character" received from the computer is routed (block 23) to the "convolution logic" in the apparatus. The character is altered or "convoluted" by this logic (block 24), and the resultant "convoluted character" is returned to the computer (master device), as indicated by block 25.

After return of the convoluted character, the character counter is decremented (block 26) and tested (block 27). If the counter value is not zero (line 28), the receive-a-validation-character/convolute-the-character/-return-the-convoluted-character/decrement-and-test-the-counter process is repeated. When the counter value reaches zero (line 29), the validation mode is disabled (block 30); (Path P5). Disabling the validation mode also resets the validation mode enabled condition (block 11), thereby re-enabling the normal mode of operation.

In this embodiment of the invention, the operations described above are controlled by the terminal's microprocessor, which receives instructions from the terminal's read-only memory (ROM), as indicated more fully hereinafter. The microprocessor does not perform the actual convolution of the validation data; it routes validation characters to and resultant convoluted characters from the convolution logic.

Figure 2:
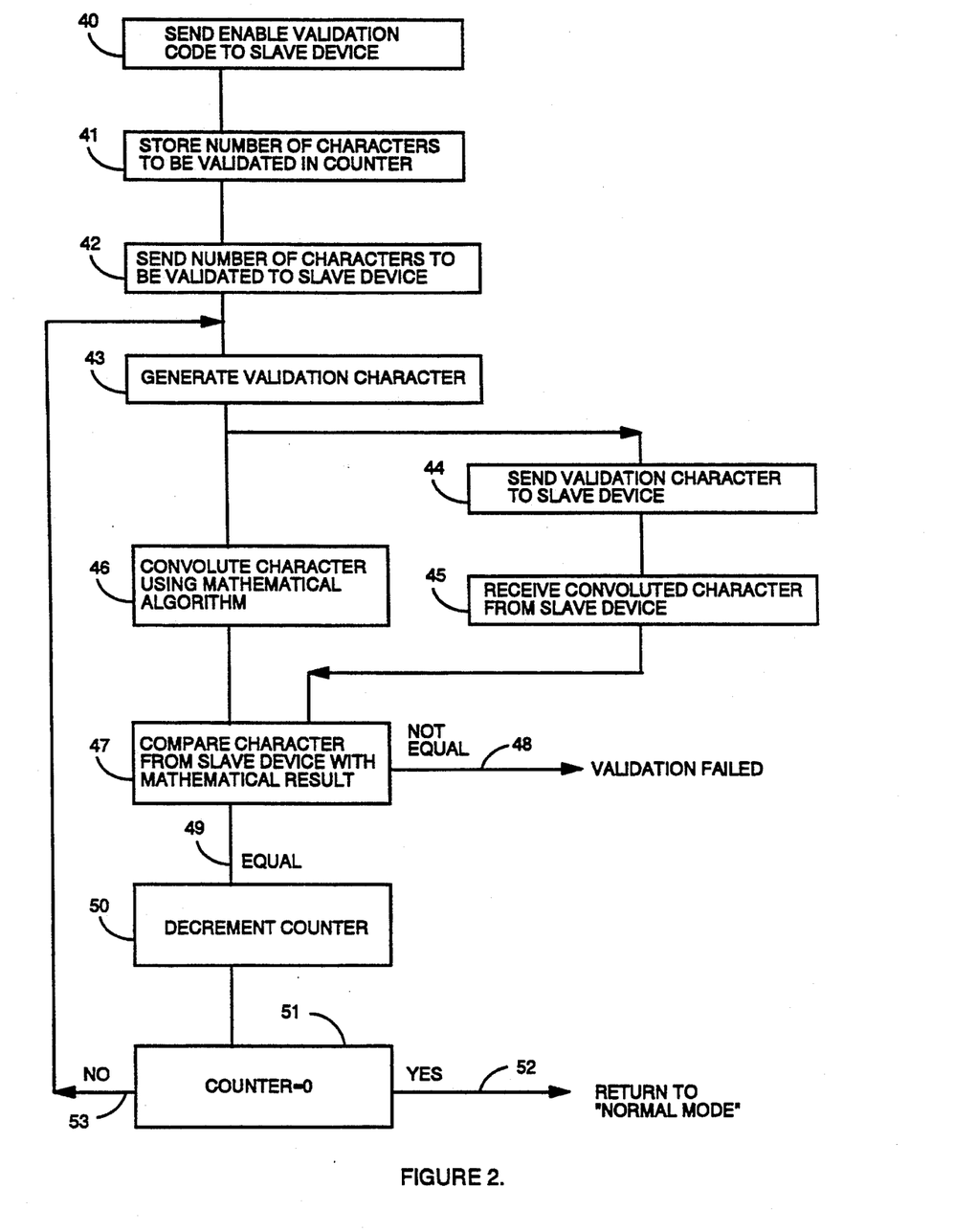
FIG. 2 is a flow diagram of information within the master device during the validation process in an access authorization system in accordance with the principles of this invention.

FIG. 2 shows the functional flow of operations within the master device during the validation process. The computer sends the enable validation code to the terminal (slave device, block 40) to initiate its validation mode. The computer then specifies the number of characters to be used for validation; this value is stored in a counter in the computer (block 41), and the same value is sent to the terminal (block 42), where it is also stored. This number is used to synchronize completion of the validation process.

The computer generates the validation data (block 43); a validation character may be any character which can be generated by the computer and accepted by the terminal. Each validation character sent to the validation apparatus by the computer (block 44) is convoluted by the apparatus' convolution logic and the resultant convoluted character is returned to the computer (block 45).

The computer software includes a mathematical algorithm equivalent to the convolution process implemented through electronic circuit elements in the validation apparatus. Concurrent with convolution by the validation apparatus, each validation character is also convoluted by the computer, using this mathematical algorithm (block 46).

The computer compares the electronically-convoluted result returned by the convolution apparatus to the mathematically-convoluted result from the computer software (block 47). If the results are not equal (line 48), it is presumed that the terminal associated with the validation apparatus is not authorized to access information contained in or controlled by the computer. If the results are equal (line 49), the validation process continues.

The character counter in the computer is decremented (block 50) and tested (block 51) after each convolution. A zero value in the counter (line 52) indicates successful completion of the validation process; it is presumed that the terminal is authorized to access information, and the computer resumes normal operation. If the value in the counter is not zero (line 53), the generate-a-validation-character/mathematically-convolute-the-character/send-the-validation-character/receive-a-convoluted-character/compare-convoluted-characters/decrement-and-test-the-counter process is repeated.

FIGS. 1 and 2, as discussed above, show the flow of information in the terminal, validation apparatus, and computer in a typical implementation in accordance with the principles of this invention. FIGS. 3–7, discussed below, show electrical signal flow and physical aspects of the invention.

Figure 3:
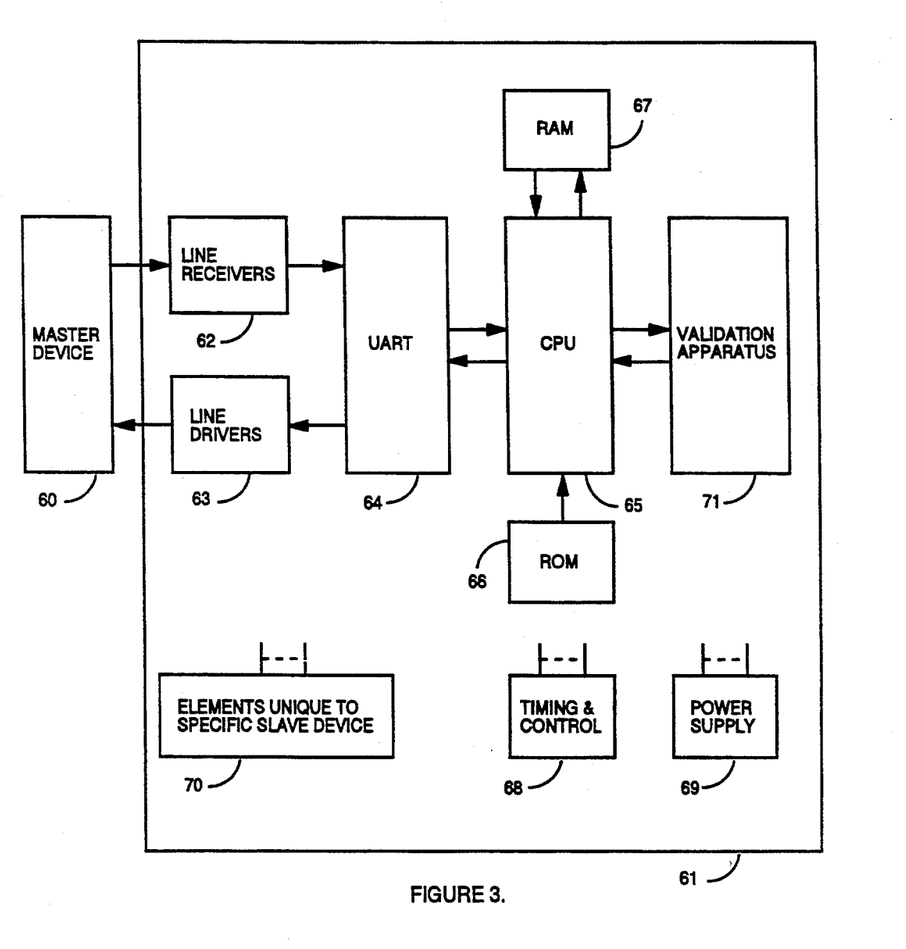
FIG. 3 is a block diagram of a typical slave device, with the validation apparatus of this invention added onto or implemented inside the slave device.

FIG. 3 shows the major elements of one embodiment of an add-on implementation of the present invention. The computer (master device) 60 performs the operations shown in FIG. 2 and described above.

A typical terminal (slave device) 61 includes interface elements which allow it to communicate with the computer. With the commonly-used RS-232C serial data interface, these elements comprise signal line receivers 62, line drivers 63, and a universal asynchronous receiver/transmitter (UART) 64 which acts as a communication controller. The UART is connected to a microprocessor CPU 65 through data, address, and control lines. The CPU receives instructions from read-only memory ROM 66 and can store information to and retrieve information from random-access read/write memory RAM 67. Timing and control circuitry 68, a power supply 69, and additional elements unique to the specific device 70 are also included in the slave device. The character counter need not be a separate element; a register in the CPU or a storage location in RAM can serve as the counter. In this add-on embodiment, the validation apparatus 71 is physically inside the terminal.

The terminal's CPU receives validation characters in the same manner as any other data sent by the computer to the terminal. When the validation mode of the invention is enabled, however, these characters are routed to the validation apparatus instead of to the terminal's normal circuitry. Similarly, the validation apparatus provides convoluted characters to the terminal's CPU for return to the computer; these characters are sent to the computer in the same manner as other data from the terminal.

Figure 4:
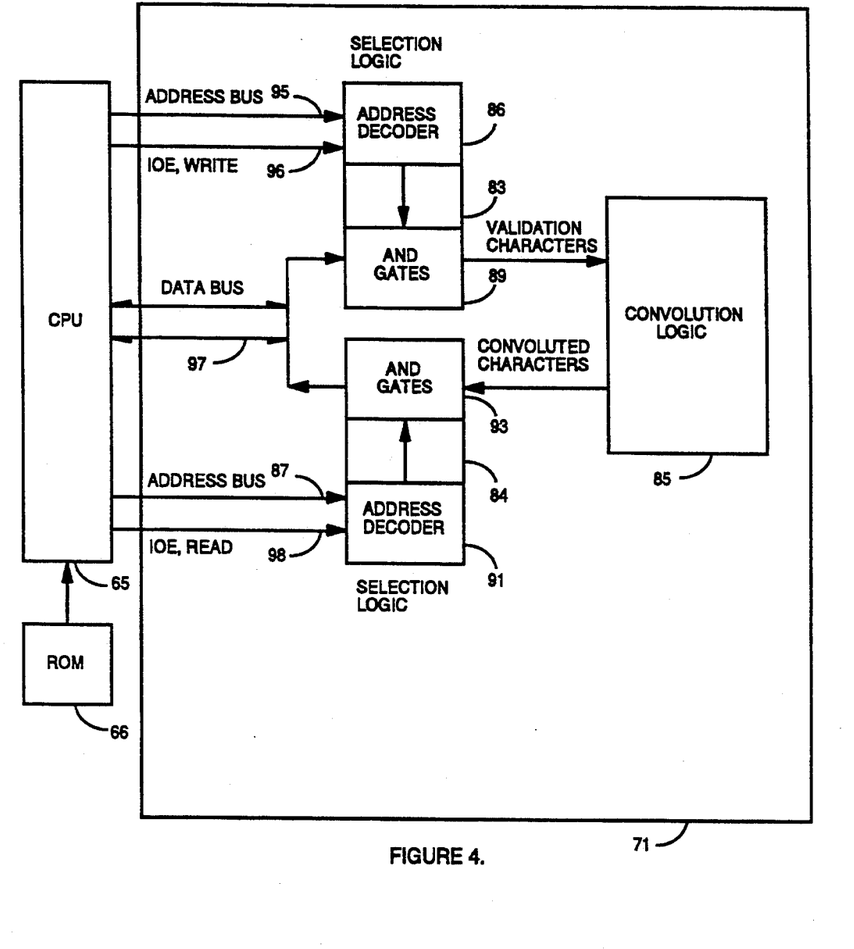
FIG. 4 is a detailed block diagram of an embodiment of the validation apparatus of FIG. 3.

FIG. 4 shows the functional elements of a validation apparatus 71 of FIG. 3. The terminal's microprocessor CPU (65 of FIG. 3), which is controlled by program instructions contained in the terminal's ROM (66 of FIG. 3), sends address and control signals to "selection logic" 83 and 84 in the validation apparatus. The selection logic uses these signals to route validation characters to and convoluted characters from the convolution logic 85.

Selection logic 83 and 84 each include an address decoder 86 and 91 and AND gates 89 and 93, respectively. The output of address decoder 86 becomes "active" when the terminal's CPU places a specific address on the terminal's address bus 95 and generates "input/output enable" (IOE) and "WRITE" signals 96. This active output enables AND gates 89, which electronically connect the data inputs of the convolution logic to the terminal's bidirectional data bus 97. The CPU concurrently places a validation character on the data bus for receipt by the convolution logic.

Similarly, the output of address decoder 91 becomes active when the CPU places a specific address on the address bus and generates IOE and "READ" signals 98. This active output enables AND gates 93, which electronically connect the data outputs of the convolution logic to the data bus, thereby providing a convoluted character to the terminal's CPU.

Some embodiments of the invention may not require separate AND gate elements as described above, since specific circuit elements which can be used in the convolution logic inherently perform the AND function (e.g., where the input elements are "flip-flops", or where the output elements are "tri-state buffers"). Selection logic techniques are well known in the art, and details of their implementation need not be discussed herein.

The convolution logic functionally comprises logical elements such as AND gates, OR gates, inverters, etc. These elements are selected and interconnected to perform logical manipulation of validation characters in accordance with a pre-determined pattern or algorithm.

A simple example illustrates character convolution by the convolution logic. In this example, information between the computer and the terminal is represented by ASCII code, and the convolution algorithm converts upper-case alphabetic characters to lower-case and vice versa.

In ASCII code, upper-case alphabetic characters are assigned decimal code values from 65 to 90; lower-case characters have codes from 97 to 122. The difference between upper- and lower-case code values for a specific alphabetic character is 32 (e.g., "A" has a code value of 65; "a" has a code value of 97).

Each ASCII character is defined by 7 data bits (D0–D6). Bit D6 is "active" for all characters with decimal codes from 64 to 127; this range includes all upper- and lower-case alphabetic characters. (For simplicity, the characters @[\] ^ _ ` { | } ~ and delete, also having bit D6 active, with codes 64, 91–96, and 123–127, are convoluted in this example.) If bit D5 is inactive, the character is upper-case; if bit D5 is active, the character is lower-case. Thus, to convert alphabetic characters from uppercase to lower-case and from lower-case to upper-case, the convolution process is: if D6 is active, invert D5.

Figure 5:
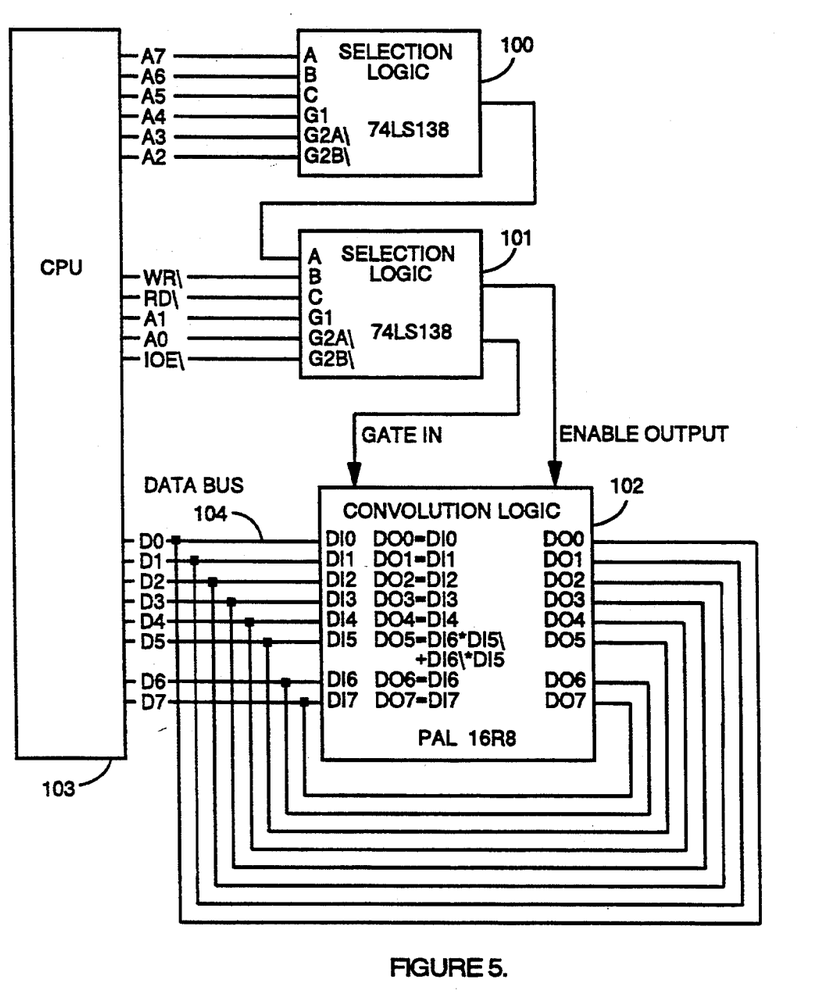
FIG. 5 is a circuit diagram of an embodiment of the validation apparatus of FIG. 4 designed to perform upper-case-to-lower-case and lower-case-to-upper-case convolution.

FIG. 5 is a circuit diagram of an embodiment of the validation apparatus for this example. The selection logic 100 and 101 comprises two integrated circuit chips such as type 74LS138 3-to-8-line decoders. The convolution logic 102 is a programmable array logic chip (PAL) with registered outputs, such as type 16R8, electronically programmed to perform the specific upper-case-to-lower-case/lower-case-to-upper-case convolution.

In this embodiment, the hexadecimal value F2 is used to address the validation apparatus; this value is present when address bits A7, A6, A5, A4, and A1 are active and bits A3, A2, and A0 are inactive. When the terminal's CPU 103 (compare 65 of FIG. 3) executes an OUT F2 instruction, this bit pattern is placed on the address bus and the bit pattern for a validation character is placed on the data bus 104. The input/output enable (IOE\) and WRITE (WR\) signals also become active, thereby "gating" the validation character's bit pattern into the PAL. The logical elements in the PAL perform the pre-defined convolution (if data bit D6 is active, invert data bit D5), and store the resultant data bit values in the PAL's internal flip-flops. When the CPU executes an IN F2 instruction, the same address is placed on the address bus and the IOE\ and READ (RD\) signals become active. This enables the PAL's internal tri-state output buffers, thereby gating the outputs of the flip-flops onto the data bus, and thus providing the convoluted character to the CPU.

To minimize the likelihood of successful attempts to discover the algorithm to gain unauthorized access to the computer, a different algorithm can be developed for each specific installation of the invention. Development of algorithms suitable for the convolution process is known through the art of mathematical techniques for data communications, and a detailed discussion is outside the scope of this description.

It is obvious, however, that convolution algorithms can be far more sophisticated than in this example. Outputs of logical elements which provide "registered" or "feedback" operations allow the result of one convolution to be dependent on the result of one or more preceding convolutions. Multiple sets of convolution logic can be implemented in the validation apparatus, with the computer specifying which set is to be used for each convolution. To further frustrate discovery of the algorithm, part of the convolution can be performed by the logic circuitry in the validation apparatus and part by operations implemented in the terminal's ROM program and performed by its CPU.

Figure 6:
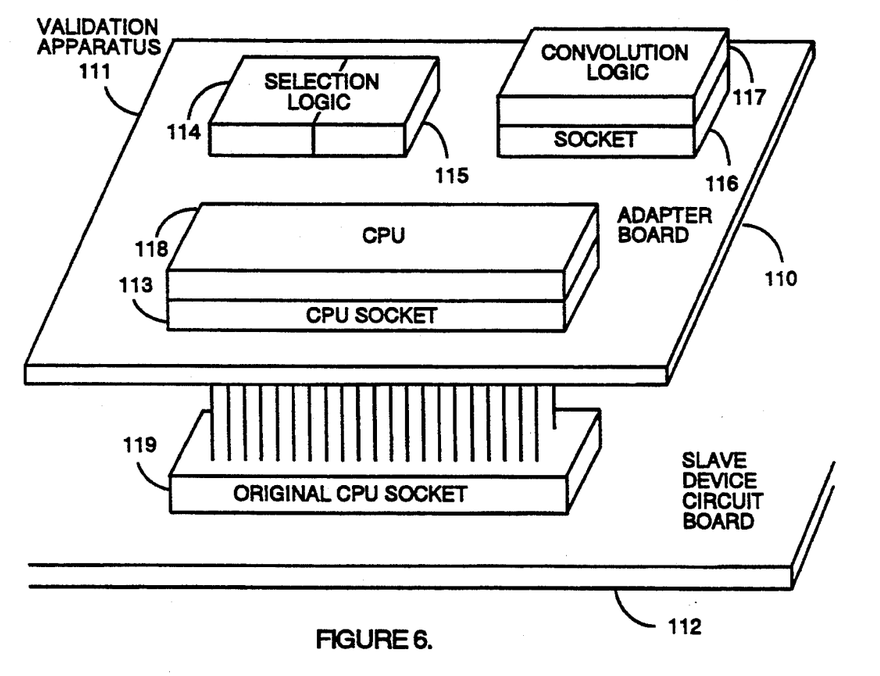
FIG. 6 illustrates the physical form of an "add-on" implementation of the validation apparatus of FIG. 5, in which an adapter board provides interconnection and mounting for the elements of the validation apparatus.

FIG. 6 represents a physical embodiment of the add-on implementation of FIG. 5. A small printed circuit adapter board 110 provides mechanical support and electrical interconnection between the elements of the validation apparatus 111 and between these elements and the terminal.

A CPU socket 113 with pins long enough to provide clearance between the adapter board and the terminal's (slave device) circuit board 112 is mounted on the adapter board. The selection logic 114 and 115 and a socket 116 for the convolution logic are also mounted on the adapter board. Interconnection between these elements is provided by printed circuit wiring traces on the adapter board.

The convolution logic 117 is inserted into its socket on the adapter board. The CPU chip 118 is removed from its original socket 119 on the terminal's circuit board and inserted into the CPU socket on the adapter board. The adapter board is connected to the terminal by inserting the long pins from its CPU socket into the original CPU socket on the terminal's circuit board.

The convolution logic comprises a set of individual logic elements (such as standard integrated circuit chips with a fixed type of operation for each chip) selected and interconnected to implement the desired convolution algorithm, or it can be a single large-scale programmable logic device element (such as a PAL) electronically programmed for the algorithm. Socketing the convolution logic allows it to be replaced when a different algorithm is desired. If multiple algorithms are desired for increased security, additional sets of convolution logic, sockets, and selection and control logic are included on a larger adapter board (not shown).

The code in the terminal's ROM (66 of FIG. 3) is augmented to perform several of the operations shown in FIG. 1. These include: testing whether the validation mode is enabled, testing whether an enable validation code has been received, storing a numeric value in the character counter and decrementing and testing the counter value, and sending data to and receiving data from the convolution logic. Other operations, such as receiving characters from and sending characters to the computer and sending normal characters to other elements of the terminal are typically implemented in the terminal's existing ROM program code.

Similarly, the computer's software is augmented to perform operations shown in FIG. 2. (Sending information to and receiving information from peripheral devices are implemented in the computer's existing software, and remain unchanged.) The additions to the computer's software for the validation process can be in the input/output routines; changes are not required in the main information processing routines.

The description above pertains to an add-on embodiment of this invention for validating access through an existing terminal to information contained in or controlled by a computer. Of course, many other functional and physical embodiments are possible for specific applications in accordance with the principles of this invention; some other possible embodiments are outlined below.

The validation apparatus can be implemented as a "designed-in" embodiment, wherein it is integrated directly into a slave device by including the convolution logic and related selection logic in the design of the device. Such an implementation is functionally similar to the add-on implementation described above, but it eliminates the need for an adapter board and the long-pin CPU socket shown in FIG. 6, as the selection and control elements and convolution logic of the validation apparatus can be mounted directly on the slave device's circuit board.

A "self-contained" implementation of the validation apparatus can be used for applications where it is not feasible or desirable to use an add-on or "designed in" implementation. The self-contained implementation comprises a separate unit whose functions and information flow are similar to those shown in FIG. 1.

A self-contained implementation can be a "serial" embodiment or a "parallel" embodiment. In a serial embodiment, the validation apparatus is placed physically and functionally between the master device and the slave device, and validation data does not have to reach the slave device. In a parallel embodiment, the validation apparatus is placed functionally "along-side" the slave device. In one form of parallel embodiment, the validation apparatus is connected to the interface link which connects the slave device to the master device, and both the slave device and the validation apparatus receive all data sent to either by the master device. In a second form of parallel embodiment, a separate interface link connects the validation apparatus to the master device or to validation means associated with the master device.

Figure 7:
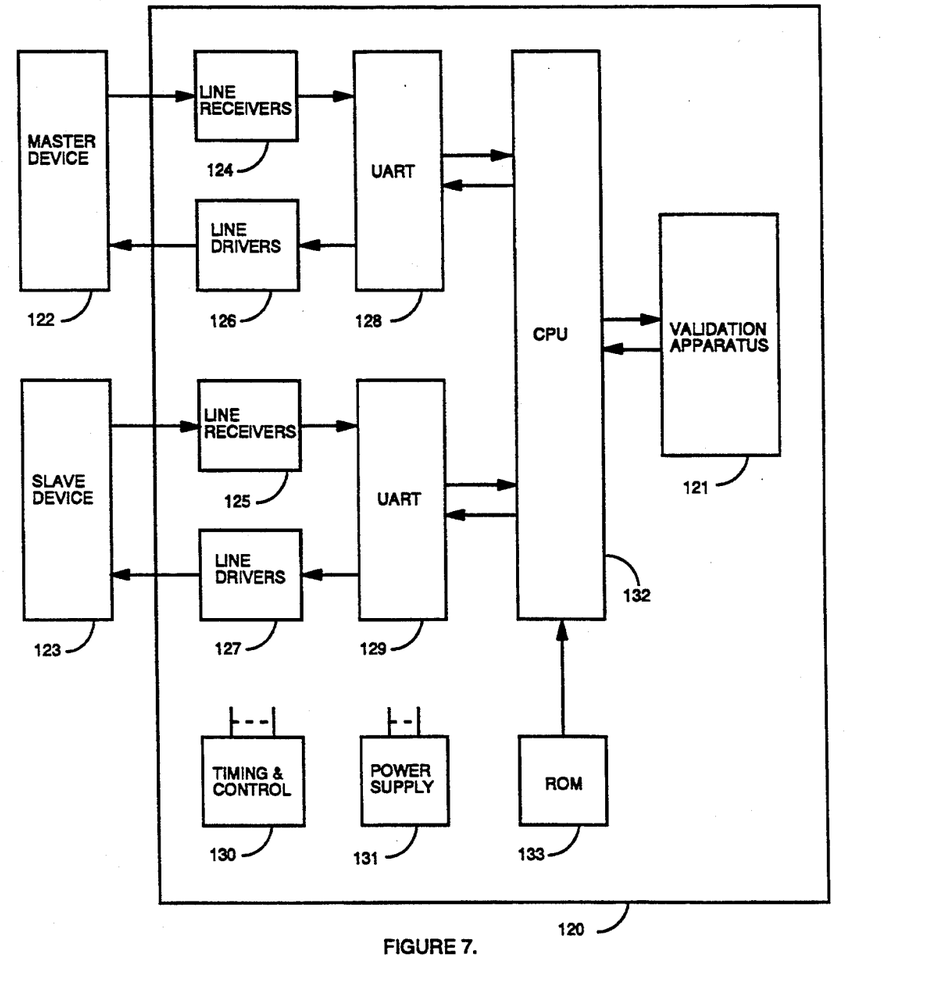
FIG. 7 is a block diagram of a "self-contained", "serial" implementation of the validation apparatus and required support elements of FIG. 3, in which the apparatus is installed as a unit physically separate from the slave device.

FIG. 7 is a block diagram of a self-contained implementation 120 in a serial embodiment. This embodiment includes two sets of interface elements to allow the validation apparatus 121 to communicate with both the master device 122 and the slave device 123. These elements include duplicate communication line receivers 124 and 125, line drivers 126 and 127, and UARTs 128 and 129. Timing and control circuitry 130 and a power supply 131 support the other elements in the unit.

The microprocessor (CPU) 132 and ROM 133 can be separate elements, or a micro-controller that incorporates both CPU and ROM functions can be used. Random-access memory is not required for a self-contained implementation of the validation apparatus.

What is claimed is:

1. Apparatus comprising processing means for processing validation data; said processing means including means for receiving validation data from an interconnected validation device which autogenically generates and transmits validation data and commands, means for convoluting said validation data in accordance with a pre-defined algorithm to produce convoluted data, and means for returning said convoluted data to said validation device; and means responsive to the validation device for selectively enabling and disabling the processing of said processing means.

2. Apparatus in accordance with in claim 1, wherein said processing means includes means for selective return of said convoluted data upon command from said validation device.

3. Apparatus as in claim 1, wherein said processing means includes means for convoluting the validation data according to a second algorithm, and means for selecting one of said algorithms in response to a command from said validation device.

4. An access authority validation system comprising a slave device operative to access a master device through an interconnecting interface link, said system also including validation means associated with said master device for validating authority of said slave device to access said master device, said system also including apparatus associated with said slave device interconnected through said interface link to said validation means, said apparatus being responsive to an access validation command from said validation means to convolute in a predetermined manner a set of data transmitted to it by said validation means so as to produce a set of convoluted data and to return the set of convoluted data to said validation means;

said validation means including means for autogenically generating and transmitting said validation command and said set of data to said apparatus, means for receiving said set of convoluted data returned by said apparatus, means for convoluting the transmitted set of data to produce a convoluted data set, and means for comparing the convoluted data set to the said set of convoluted data returned by said apparatus.

5. A system as set forth in claim 4, wherein said validation means also includes means operative autogenically for switching between a normal access mode and an access validation mode.

6. A system as set forth in claim 4, wherein said predetermined manner of convolution includes a plurality of algorithms for said convolution and wherein each said access validation command specifies which of said plurality of algorithms defines the convolution of each said transmitted set of associated data.

7. A system as set forth in claim 4, wherein each said access validation command specifies the number of data units to be convoluted in each said transmitted set of associated data.

8. A system as set forth in claim 4, wherein said apparatus includes electronic circuitry for said convolution of said data transmitted to it.

9. A system as set forth in claim 4, wherein said validation means includes means for signaling the occurrence of a mismatch as determined by said comparison of said two sets of convoluted data.

10. A system as set forth in claim 4, wherein said validation means is incorporated into said master device.

11. A system as set forth in claim 4, wherein said apparatus is incorporated into said slave device.

12. A system as set forth in claim 4, wherein a single, common interface link functions both as said interface link interconnecting said master device and said slave device and as said interface link interconnecting said validation means and said apparatus.

13. A system as set forth in claim 4, wherein a plurality of said slave devices are operative to access said master device.

14. A system as set forth in claim 4, wherein said slave device is operative to access at least one device external to said master device and wherein access to said external device is controlled by said master device.

15. An information process network comprising a master device which controls information, at least one slave device which desires access to said information, an interface link interconnecting said master device and said slave device, and a system to validate authority of said slave device to access said information controlled by said master device, said validation system including apparatus associated with said slave device interconnected to validation means associated with said master device, said apparatus being responsive to a validation command from said validation means to convolute in a predetermined manner validation data transmitted to it by said validation means and to return the convoluted data to said validation means, said validation means including means for generating said validation command said validation data autogenically, means for transmitting said validation command said validation data to said apparatus, means for receiving said convoluted data returned by said apparatus, means for convoluting said transmitted data in accordance with said validation command, and means for comparing the thus convoluted data with the said convoluted data returned by said apparatus, a mismatch determined by said comparison signifying that said slave device is not authorized to access said information controlled by said master device.

16. A network in accordance with claim 15, including means to autogenically switch between at least two modes of operation, a first such mode being a normal access mode in which information passes unchanged between said master device and said slave device, and a second such mode being an access authority validation mode, said validation mode including said generation, said transmission, said convolutions, said return, and said comparison.

17. A network in accordance with claim 16, further including means for operating in a combination mode wherein said validation data is embedded in a normal data stream, and wherein said slave device and said master device operate in said normal access mode using said normal data stream, and said apparatus and said validation means concurrently operate in said access validation mode using said embedded validation data.

* * * * *